United States Patent [19]

Ekstrom

[11] Patent Number: 6,052,597
[45] Date of Patent: Apr. 18, 2000

[54] SHORT MESSAGE SERVICE INITIATED CELLULAR MOBILE POSITIONING SYSTEM

[75] Inventor: Tommy Ekstrom, Karlskrona, Sweden

[73] Assignee: Europolitan AB, Karlskrona, Sweden

[21] Appl. No.: 08/894,151

[22] PCT Filed: Feb. 16, 1996

[86] PCT No.: PCT/SE96/00210

§ 371 Date: Aug. 15, 1997

§ 102(e) Date: Aug. 15, 1997

[87] PCT Pub. No.: WO96/25830

PCT Pub. Date: Aug. 22, 1996

[30] Foreign Application Priority Data

Feb. 16, 1995 [SE] Sweden .................................. 9500569
Aug. 29, 1995 [SE] Sweden .................................. 9502976

[51] Int. Cl.⁷ ........................................................ H04Q 7/22
[52] U.S. Cl. ........................ 455/456; 455/466; 342/367; 342/450
[58] Field of Search .................................. 455/456, 457, 455/466, 422, 517, 458; 342/367, 450, 451

[56] References Cited

U.S. PATENT DOCUMENTS 5,794,142  8/1998  Vantilla et al. ....................... 455/466 X
5,901,358  5/1999  Petty et al. ........................... 455/457 X

FOREIGN PATENT DOCUMENTS 0 501 058 A2  6/1991  European Pat. Off. .
0 600 162 A1  8/1993  European Pat. Off. .
WO 92/05672  2/1992  WIPO .
WO 94/01978  1/1994  WIPO .

*Primary Examiner*—Wellington Chin
*Assistant Examiner*—Philip J. Sobutka
*Attorney, Agent, or Firm*—Bacon & Thomas

[57] ABSTRACT

The position of a mobile station in a cellular mobile telephone system, particularly a GSM system, is determined by carrying out a simulated call setup, i.e., the call setup is interrupted subsequent to a telephone switching center (MSC) having received a paging response containing the identity of the cell and, optionally, a timing advance. The simulated call setup is initiated by generating a modified short message signal (SMS) which is not registered in the SMS catalogue of the mobile station and which is not shown to the user of the mobile station. The SMS commands the mobile station to carry out a position determining sequence in order to establish parameters for use in establishing the position of the mobile station, for example by commanding the mobile station to connect itself to a base station contained in its neighbor list, analyze the geographical position of the base station, and subsequently send the position determining parameters to a position handler. The geographical position of the base station is analyzed from the cell identity and, if available, the timing advance, the position of the mobile station being presented graphically on a picture screen and constantly updated after each call setup. The call setups are generated by the position handler.

40 Claims, 4 Drawing Sheets

SHORT MESSAGE SERVICE INITIATED CELLULAR MOBILE POSITIONING SYSTEM

TECHNICAL FIELD

The present invention relates to a method and to a system for determining the position or location of a mobile station in a cellular mobile telecommunications system. In a preferred method and apparatus embodiment, the invention relates to a method and to a system of apparatus for localizing vehicles equipped with mobile stations by updating their position in a cellular GSM mobile telecommunications system, either at frequent-intervals or instantaneously.

DESCRIPTION OF THE BACKGROUND ART

Existing positioning functions are based, among other things, on the use of the GPS system (Global Positioning System). GPS is an accurate position-determining satellite system. The system uses many satellites, where a receiver receives signals from several channels and from different satellites. The receiver determines the mutual phase position between direct sequences received from different satellites and calculates their positions in three coordinates from an equation system.

Positioning systems based on the GPS system also exist. The positioning information is transmitted with the aid of GSM technology (Global System for Mobile communication) or with the aid of some other cellular telecommunications technique (Mobitexe). This requires firstly capacity utilization in the GSM technique for short message services (SMS), and secondly it incurs costs in the GSM system and costs in the GPS system.

SUMMARY OF THE INVENTION

The invention is intended to provide in cellular mobile telecommunications system a method and a system for establishing the geographical position or location of a mobile station in the system, either with regard to time or distance. In a particular embodiment, the mobile station accompanies a vehicle, wherein the geographical position of the vehicle can be presented on a graphic screen for subscriber information.

In one embodiment of the method of determining the position of a mobile station in a cellular mobile telecommunications system in accordance with the invention, the mobile telecommunications system sets up a simulated call connection generated by a position handler. The position handler contains mobile station categories and stations intended for simulated call connection, said connection being released after the system has sent a paging message to a mobile station and when a reply to the paging message has been received from the mobile station. This response is used to determine the cell in which the mobile station is located, via the identity of the cell. The timing advance (TA) of a mobile station can be used together with the cell identity to obtain more accurate positioning of a mobile station in the cell. The position handler converts at least one of the parameters cell identity and timing advance (TA) to establish the geographic position of the mobile station.

In one embodiment, the position handler includes the register HLR in GSM for categorizing mobile stations intended for simulated call connection. Position handlers are comprised of the means that are provided in a telephone services switching centre or an exchange for establishing call connections and are used to generate and analyze simulated call connections and call releases.

In a further embodiment, the position handler includes an administrative means having a register for categorizing mobile stations that are intended for simulated call connections, and at least one call generator for generating and analyzing call connections and call releases respectively.

At least one of the parameters cell identity and timing advance (TA) are processed so as to be converted continuously to give the longitude and latitude of the mobile stations paged via the position handler, after each simulated call connection. A graphic presentation of the location of a given mobile station is transmitted to the subscriber requesting the simulated call connection, the position or location of the mobile station being subsequently updated for presentation. The subscriber requesting the call connection is also given the possibility of determining the frequency of a simulated call connection.

Mobile stations which accompany vehicles are marked on this graphic presentation, wherewith information relating to the vehicles can be obtained via the presentation, by activating the marker. Information from the graphic presentation can be obtained on a screen, by marking and activating relevant vehicles with the aid of known computer means for marking graphic presentations.

The method also enables a positioning connection requested by a subscriber to be interrupted subsequent setting up a determined number of simulated call connections with which no change in the position of a mobile station is detected, and to restore the connection subsequent to having detected one or a determined number of positional changes in the location of the station.

In mobile stations that accompany a vehicle, a change of driver is detected by the identity which a driver activates or deactivates in the station. Activation of the mobile station can be effected through the medium of the SIM module of the driver, for instance.

In addition, when a mobile station which is classed powerwise as being hand-carried is placed into or removed from an adapter equipped with power amplification, the change in transmission power will trigger the mobile telecommunications system and the position handler and inform the same that a simulated call connection shall be established or released respectively.

According to one embodiment, the invention relates to a system for determining the position of a mobile station in a cellular mobile system. The system includes a position handler having a register of mobile stations that are intended for simulated call connections, and means for generating and analyzing call connections and call releases in the switching centres of the mobile telecommunications system. A call connection is released when a paged mobile station replies to a paging message, wherewith the position handler processes at least one of the parameters cell identity and timing advance (TA) to establish the position or location of the mobile station geographically.

The register may be comprised of an HLR in GSM and means provided in a switching centre (GMSC, MSC, BSC) and usable to generate and release simulated call connections. The register may alternatively comprise a database for categorizing stations intended for simulated call connections. The position handler may alternatively comprise an administrative means that includes a register, together with a call generator, for generating and analyzing call connections and call releases respectively.

The system is also able to process the identity of cells and, when applicable, also the timing advance (TA) so as to enable the same to be converted regularly and therewith provide the longitude and latitude of the mobile stations paged via the position handler subsequent to having set up a simulated call connection.

A graphic presentation of the location of a given mobile station can be sent electronically to the subscriber requesting simulated call connection via the system and customer positioning connections intended therefor. The position of the mobile station in the system is updated regularly on the presentation after setting up a call connection in accordance with the wishes of said subscriber. The subscriber ordering a simulated call connection is given the possibility of determining the call connection frequency. Vehicles having accompanying mobile stations are marked on the graphic presentation, wherewith information can be obtained relating to marked vehicles by activation via the presentation. Vehicle information is obtained from a screen by marking and activating concerned vehicles with the aid of known computer means for marking graphic presentations.

The customer positioning connection can be interrupted subsequent to having made a number of simulated call connections without the position of a mobile station changing, and can be re-established when detecting one or a determined number of positional changes.

In mobile stations which accompany a vehicle, the system will function to detect a change of driver by virtue of the identity with which a driver activates and deactivates the station. Activation and deactivation of the mobile station can be effected via a SIM module.

In addition, a mobile station which is classed power-wise as a hand-carried station can be caused to trigger and inform the mobile telecommunications system and the position handler that a simulated connection shall be established or released respectively, by virtue of the mobile station being placed in or removed from an adapter provided with power amplification.

In an alternative embodiment of the inventive method and inventive system, a customer or subscriber connected to a mobile positioning service orders an MS unit to position itself via a modified SMS message (Short Message Services).

The aforesaid parameters cell identity and timing advance (TA) are also utilized in this alternative embodiment, wherewith the response can be used to establish the cell in which the mobile station is located and/or the longitude/latitude position of said station. The simulated call connection also involves the transmission of a modified short message signal (SMS) which orders a call connection from mobile stations. In conjunction with this call connection, the mobile station executes a measuring process so as to enable the position handler to give the longitude/latitude of a position-paged mobile station. The SMS message is not registered in the SMS catalog of a mobile station and the user of the mobile station receives no message regarding the incoming SMS.

The position handler also includes functions for receiving and generating the SMS messages.

A position-paged mobile station is ordered to execute a position measuring sequence, by sending a modified SMS message, wherewith the mobile station sets up simulated call connections. In one embodiment, the mobile station carries out multi-station measurements, so that the position handler is able to give the longitude/latitude of a position-paged mobile station.

The SMS message is not registered in the SMS catalog of the mobile station and is thus not shown to the user of the mobile station. The position handler includes in this regard functions for receiving and generating the SMS messages.

The position of a mobile station is determined by centre-of-gravity calculations with the aid of the parameters cell identity and timing advance (TA).

A mobile station can be triggered to establish simulated call connections in response to a modified SMS message from the position handler, said SMS message including one or more cell identities. The establishment of a call connection is triggered when the cell identities are received by the mobile station.

BRIEF DESCRIPTION OF THE DRAWINGS

The invention will now be described in more detail with reference to the accompanying drawings and associated text.

DETAILED DESCRIPTION OF EMBODIMENTS OF THE INVENTION

Figure 1:
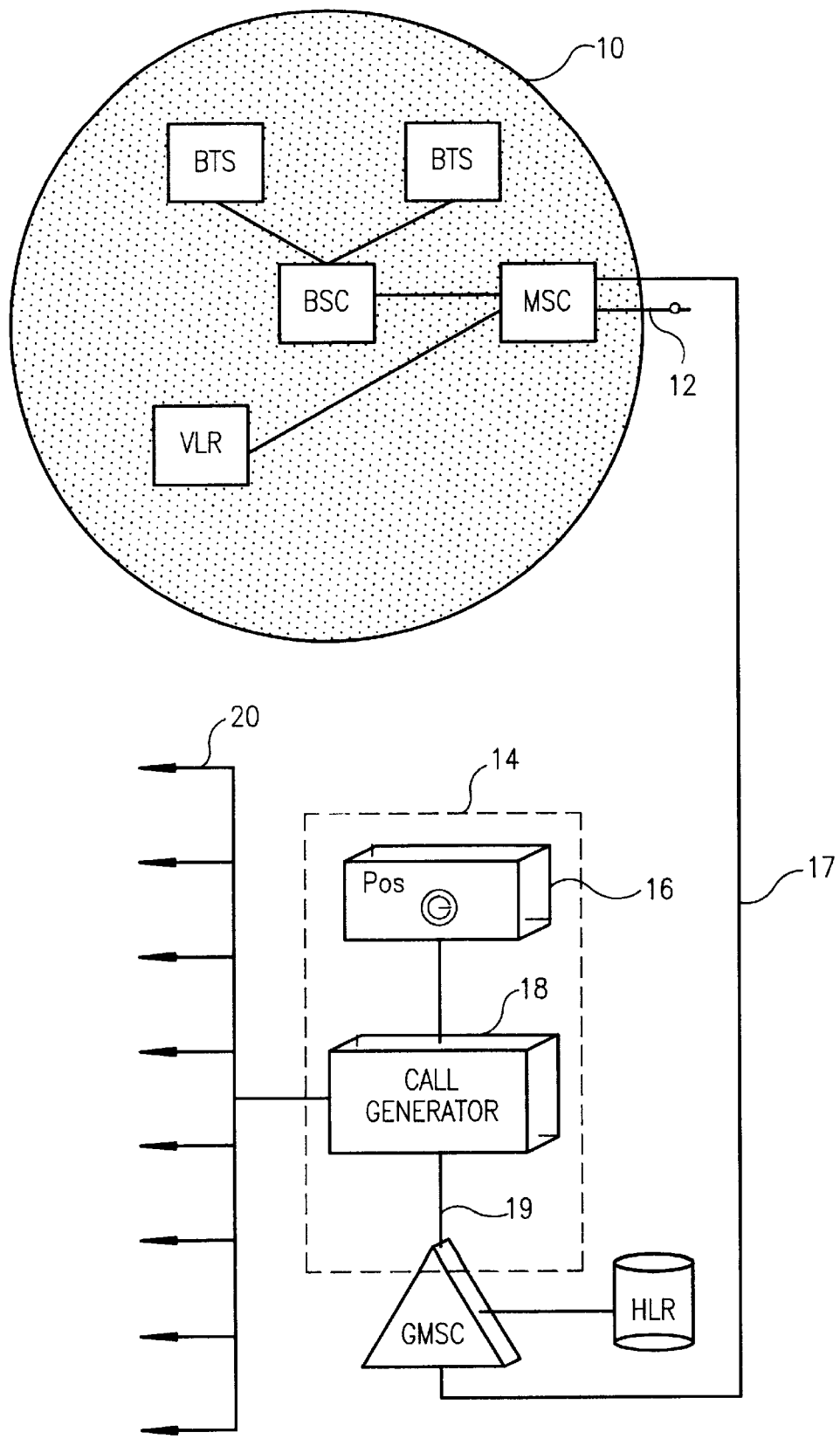
FIG. 1 is a block schematic illustrating how an inventive system is implemented in a GSM system.

A first embodiment of the present invention is based on the establishment of a simulated call connection to a mobile station (MS unit, mobile telephones in all their variations for use in a mobile telecommunications network), said call connection being released when a paged MS unit has responded (paging response), wherein the MS unit gives the identity of the cell in its response to the mobile services switching centre (MSC) via the base station within whose radio coverage area the MS unit is located. The identity of the BS unit and therewith its geographical position is identified with the aid of the cell identity. The geographical position of an MS unit in relation to the BS units is registered and updated in accordance with the frequency of the simulated call connections. In the preferred embodiments of the present invention, the reference to simulated call connections shall be understood as meaning that the call is released subsequent to having obtained desired signalling information, and also as meaning a call connection that an MS unit has been ordered to setup, via a modified SMS message. The transmission of the modified SMS message can also be considered to initiate this latter simulation.

According to the invention, the position of an MS unit in a cellular mobile telecommunications system is indicated by the position of the BS unit in the cell in which the MS unit is located. Thus, it is established that a vehicle having an accompanying or a fixedly mounted MS unit is located in the radio coverage area of a BS unit. In many applications, this will suffice to determine the position of the MS unit and indirectly also the position of the vehicle. A typical cell will have a radius of 12–15 km around roads and highways, and a slightly larger radius in remote areas, such as country areas. The radius in towns and cities is about 100 m (inner cities) and about 200 m (outlying districts). Vehicles normally move fast. A graphic presentation according to the invention enables the passage of a vehicle through the system of cells to be followed. The resolution of a geographic presentation is dependent on its scale. A resolution of about 15 km will therefore be fully sufficient for certain chart or map scales. It will be observed that the aforesaid 15 km resolution is one of several extreme cases when solely using cell identity for positioning purposes.

The parameter timing advance (TA) can be used to obtain more accurate positioning with better resolution than the extreme case of 15 km. A certain TA is allocated to an MS unit in a TDMA system in accordance with the distance of the MS unit from the BS unit, such that the MS unit transmits beforehand and in this way will be located within the time slot allocated for transmission. If the timing advance of the MS unit is known, information is thus obtained as to the distance of the MS unit from the BS unit. Timing advance and the manner in which it is used in the inventive embodiments will be explained in more detail below with reference to FIG. 4.

The embodiments of the invention will be exemplified in the following with respect to a GSM system. However, the invention is not restricted for use solely in this system, but can also be used in other digital and analog mobile telecommunications systems. In a cellular GSM mobile telephone system GSM (Global System for Mobile communication) which communicates with TDMA (Time Division Multiple Access) over the radio interface, i.e. communication in uplink from an MS unit to a BS unit, time slots are generated and allocated to the MS unit. A BS unit also communicates with time slots in downlink to MS units. The uplink radio channels and downlink radio channels are separated by duplex spacing (e.g. 45 MHz). TDMA in mobile telephone applications is a well-known technique to one of normal skill in this art, as are also the GSM recommendations administered by ETSI (European Telecommunication Standards Institute), and consequently TDMA and GSM will not be described in more detail in this document.

FIG. 1 is a schematic illustration, in block form, showing how an inventive system is implemented in a cellular GSM mobile telephone system.

The circle in the Figure marks a service area 10 in a GSM system. The service area 10 is connected to other service areas (not shown) via the mobile services switching centre MSC. The illustrated switching centre MSC is connected to a base station controller (BSC). In GSM, the base station controller has taken over a part of those functions which in other systems are managed by the mobile services switching centre in controlling and monitoring base stations. The base stations in GSM are designated BTS (Base Transceiver Station). A BTS unit communicates in duplex with MS units that are located in the area covered by the BTS unit. The mobile services switching centre illustrated in the Figure is also connected to a visitor location register (VLR). Reference numeral 12 indicates schematically the connection of the switching centre MSC to the mobile services switching centres of other service areas.

GSM systems include a register designated HLR (Home Location Register). When a subscriber subscribes to a mobile telephone service run by a GSM-Operator, this is registered in the Operator's home location register HLR. The HLR register contains general subscriber information and subscriber services. The HLR register also contains information relating to the service area in which an MS unit is located, so that the MS unit can be reached by calls.

In principle, the VLR register monitors the mobile stations that are located in the service area covered by the register. The VLR register also informs the HLR register of mobile stations that the mobiles concerned are located in its service area.

It also lies within the scope of the invention to introduce a function/service designated customer positioning in GSM and other mobile telephone systems, which enables the geographical position of an MS unit to be monitored and updated frequently in terms of time intervals or distance intervals.

FIG. 1 illustrates an inventive embodiment comprising a position handler 14A, shoAe in broken lines in FIG. 1, which in the illustrated case includes an administrative position handling means Pos. 16, containing information relating to the customer positioning function and a register therefor, such as a database wherein subscriber identities of subscribers who subscribe to registration of the geographical position of a mobile station are registered and categorized in accordance with desired customer positioning services. In connection with subscriber identity, the register may also register the desired frequency at which the geographical position-shall be updated, e.g. 5 min., 7 min., etc., or in time distances of, e.g., 1 km, 5 km, 10 km, and so on. The updating frequency is generally decided by the person requesting the customer positioning service, which may be tailor made for this person. A positioning interval may, for instance, consist of reference points on a chart or map, such as cities through which the vehicle roams. In addition to updating at specific intervals, updating can be effected so as to be more frequent when the vehicle passes through a built-up area, for instance. Updating can also be restricted to a given geographical section.

The Pos. means 16 is connected to a call generating means 18 which, in turn, is connected to a Gateway-MSC (GMSC) which connects a call connection setup by the means 18 in accordance with recommended GSM standards. A Gateway-MSC is implemented through a gateway function in a mobile services switching centre and connects the mobile telephone system to system external units, for instance to a switching centre or exchange belonging to another Operator. For instance, all calls from the public switched telephone network (PSTN) are connected to the cellular mobile telephone network via a GMSC switching centre. Any mobile switching centre of a GSM system can be made a Gateway-MSC. The call generating means 18 may be a Tekelec MGTS, which is a known call generating means in telecommunication exchanges and switching centres. The means 18 generates calls in the Gateway-MSC via the positioning route 19, which connects calls to mobile switching centres in concerned service areas 10, via a trunk 17. The arrows 20 in FIG. 1 indicate connection setups from the call generator 18 for customer positioning on a graphic presentation out to the person requesting the positioning function to the administration application of said person, for instance BUDWIN® marketed by SENdIT AB. The interface between the administration application and the means 18 is based on an open standard, such as ISDN (Integrated Services Digital Network), X.25, GSM, etc. The means 18 also functions to analyze cell identity for determining the position of a mobile station.

The means 18 may alternatively be a suitable modem which is controlled by a processor-based unit, e.g. a PC unit, to generate calls in accordance with category in an internal or external register.

The position handler 14 illustrated in FIG. 1 may comprise mutually free-standing means 16 and 18, or mutually integrated means 16 and 18. FIG. 1 illustrates only one conceivable embodiment of the invention.

Since the HLR also contains information relating to desired customer services tied to the subscription with one Operator, the HLR and a call generating means may together form a position handler in another embodiment of the invention, wherein a call is connected to MS units automatically from the HLR. In this regard, the call setup means in an MSC may be used together with the home location register.

It should be noted that the term call used in the present description should be understood as a signalling procedure and not as a call in the general meaning of the word.

Figure 2:
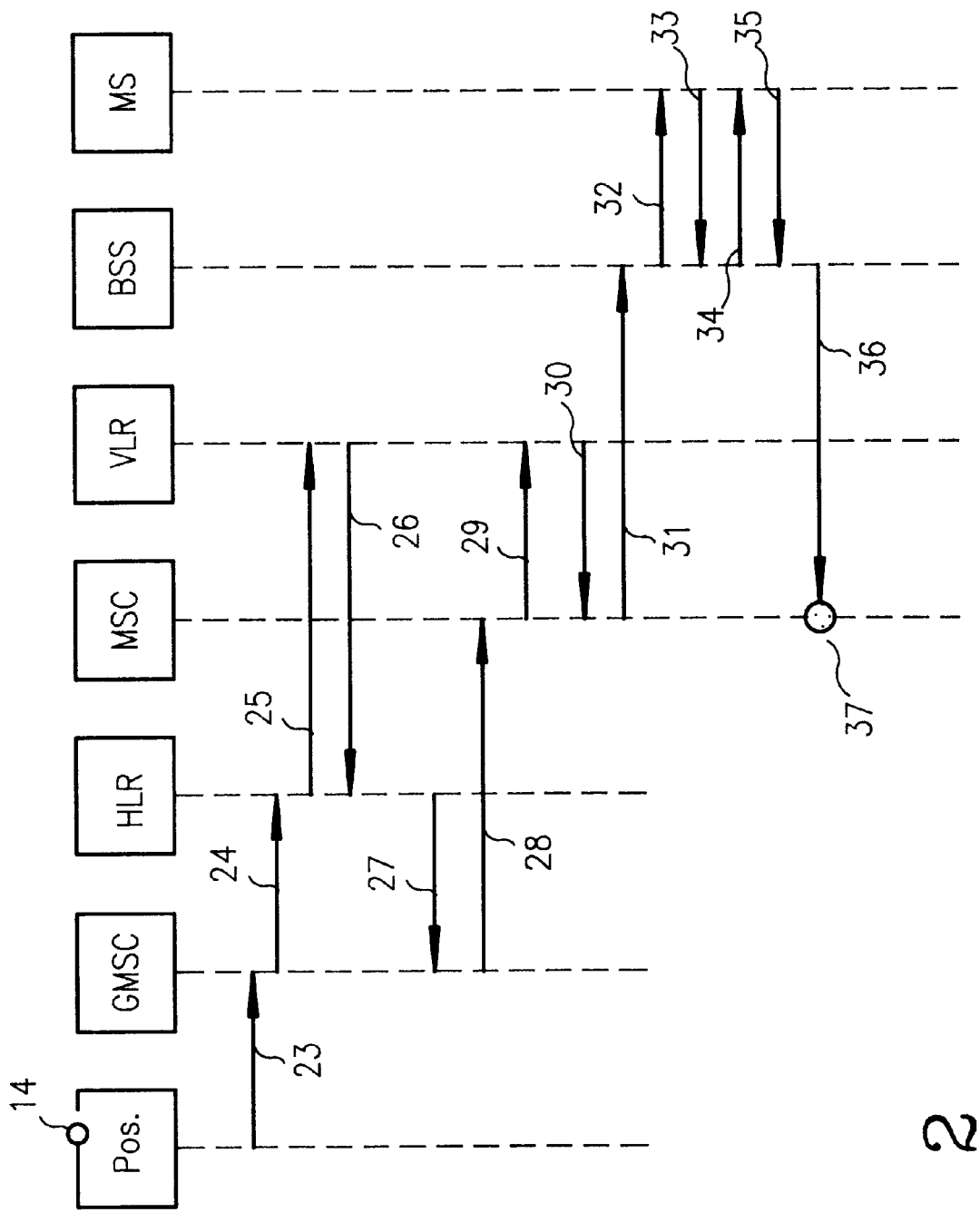
FIG. 2 illustrates the manner of setting up a simulated call connection in accordance with the invention.

FIG. 2 illustrates an example of how a call connection can be setup in a cellular mobile telephone system up to the point at which the connection is released subsequent to paging response.

The position handler 14 generates a signalling message 23 for a simulated call connection in accordance with the invention. The signalling message 23, also designated IAM (Initial Address Message), informs the Gateway-MSC of the mobile station integrated services digital network number (MSISDN). MSISDN is comprised of field CC (Country Code)+NDC (National Destination Code)+SN (Subscriber Number). GMSC responds by requesting transmission of route information SRI 24 (Send Routing Information) from the HLR unit in which the called subscriber is registered. The HLR unit registers service area and the VLR unit that contains information relating to the location of the subscriber in the system and asks the VLR unit for the MSRN (Mobile Subscriber Roaming Number) for this call, via PRN 25 (Provide Roaming Number). MSRN is used to guide the call to the correct MSC/VLR in the system. The VLR unit provides the HLR unit with RN 26 (Roaming Number), i.e. MSRN. It will be observed that the roaming number can be allocated directly in an HLR unit, whereupon the signalling 25 and 26 is superfluous. The HLR unit now sends the route information, i.e. RIA (Routing Number Acknowledge) 27 with the MSRN to the Gateway-MSC (GMSC) in acknowledgement of the receipt of the signal message 24.

In the next stage, the Gateway-MSC initiates the setup of a call connection by sending an address message IAM 28 to the MSC in the service area in which the subscriber is localized. The MSC sends the signal message SIFICS 29 (Send Info For Ic Call Setup) requesting subscriber parameters from the VLR unit, for instance restrictions on incoming calls Ic, requested bearer capability, etc. the subscriber is paged from the VLR unit via a paging request, page MS unit PMS 30 (Page MS), subsequent to the VLR unit having checked the parameters according to SIFICS 29. The paging request is sent to the MSC, said request including LAC (Lyocation Area Code), the service area code, and the subscriber's TMSI (Temporary Mobile Subscriber Identity) used for subscriber discretion.

The MSC also pages 31 all BSS systems (Base Station System), i.e. all base station systems in a given service area. A BSS is comprised of BSC's and BTS units. The BSS's then sends a paging message 32 to the MS unit via the PCH channel (Paging Channel). The MS unit concerned responds by sending a channel request CR 33 to one of the BS units (the BST units) on the RACH channel (Random Access Channel) via a random access burst. The channel is used by the MS unit to request a SDCCH channel (Stand-alone Dedicated Control Channel), said channel being used for system signalling during a call setup prior to allocation of a traffic channel TCH. The traffic channel TCH is used for communication of coded speech or coded data. In the next stage, the BSS tells the MS unit which SDCCH channel shall be used, through IA 34 (Immediate Assignment). The MS unit responds to the paging (Page) with CSR 35 (Cm Service Request) on the signalling channel SDCCH.

The BSS sends CSR 35 to the MSC through a complete layer 3 message CL31 36 (Complete Layer3 Information).

Layer 3 information can be referred to the OSI model (Open Systems Interconnection) an ISO standard for I/O handling of data in systems. The message includes cell identification (Cll ID) and TMSI. Data received by the MSC at 37 is sent to the position handler for processing and analysis. CellID is the parameter which is converted by the position handler to position parameters of an MS unit, which may be a vehicle-mounted unit. Normally, the call setup is continued at this point with further signalling, such as verification (authentication), and so on. According to the present invention, however, the setup is released in response to a call release message sent by the MSC. The message releases the call and sets to zero given statistic counters in the GSM system, wherein the simulated call setup is terminated.

Figure 3:
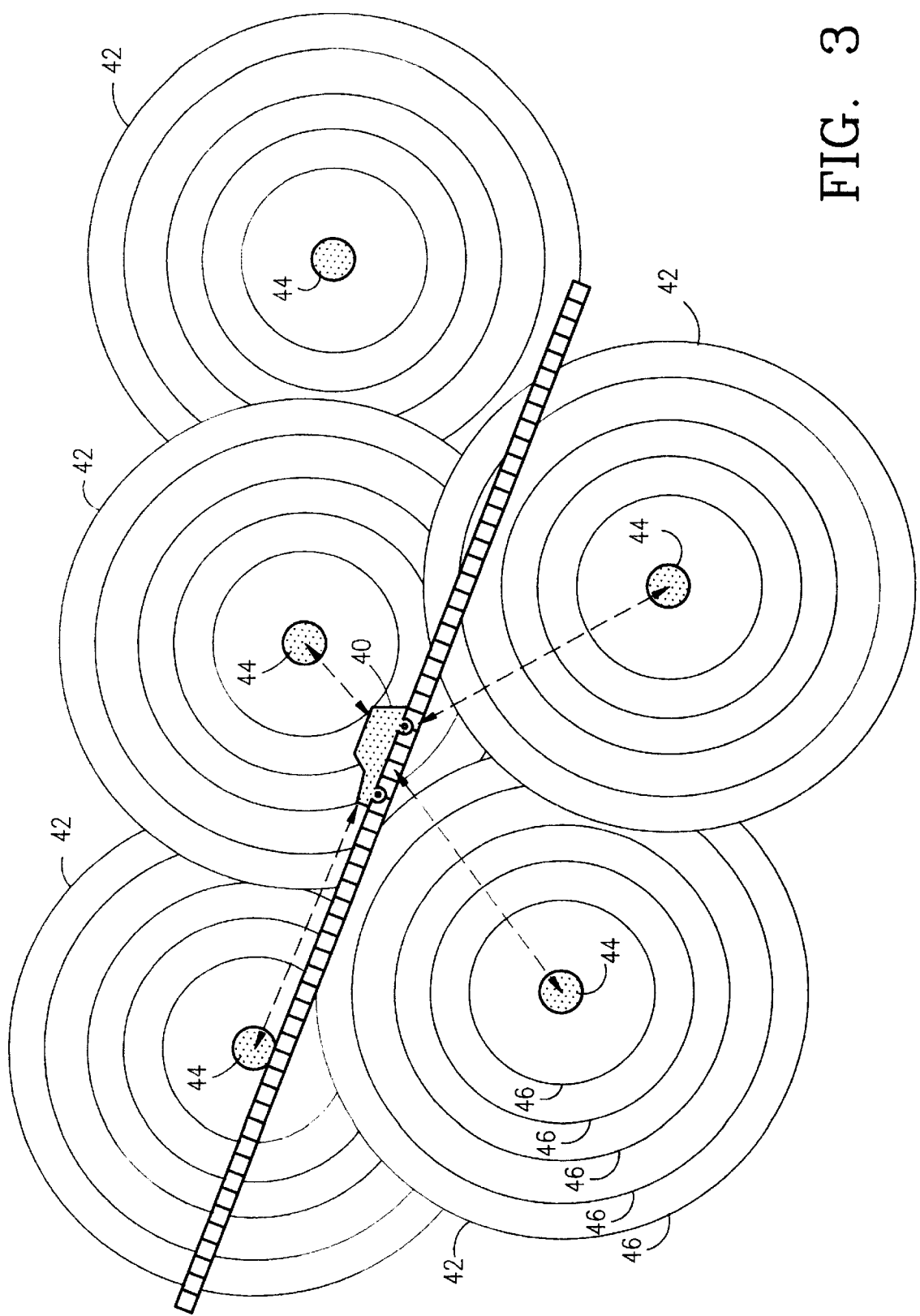
FIG. 3 illustrates schematically movement of a vehicle through a service area and the cells and base stations therein.

FIG. 3 illustrates schematically how a vehicle 40 moves in a GSM system through an imaginary geographical part covered by cells 42 of mutually different size. The reference numeral 42 indicates the cell periphery and also TA limits. The inner circles 46 denote TA limits, these limits being dealt with in more detail with reference to FIG. 4. One or more simulated call connections are setup for each cell through which the vehicle passes. The MS unit is assumed to be fixedly mounted in the vehicle 40 and in its response to each of the BS units 44 gives the cell identity along the route travelled by the vehicle. In accordance with the aforegoing, TA is also included, so as to enhance the accuracy in which the position of the MS unit is determined. The positioning system uses the cell identity in its analysis of the geographical positions of BS units.

The cell identity can thus be converted to give the longitude/latitude of BS units through the medium of cell identity analyzing means 16, 18, for instance a database included in the position handler 14, where the cell identity is tied to longitude and latitude. A graphic image in the form of a chart or map for instance can also be tied to a BS unit. The chart image can then be sent in the form of an electronic image to a picture screen possessed by the person subscribing to the positioning service. As before mentioned, BUD-WIN® is an example of existing administrative transport systems, said system being adaptable to mark vehicles graphically.

The person subscribing to the positioning service may be a haulage contractor who wishes to monitor the positions of his vehicles. The image, or picture, transmitted to the service subscriber has the vehicles graphically marked, for instance as icons, and the markings can be moved successively with each updating process. The service subscriber is able to obtain information relating to a vehicle with the aid of a computer pointing device, such as a mouse, pointer pen, control ball, for instance by clicking the mouse on the graphical marking of a vehicle. The information may consist in information relating to chauffeur, driver, the start of a journey, the destination of a journey, the load carried by the vehicle, the type of vehicle concerned, and so on, i.e. essentially all information of interest with regard to said vehicle.

A cellular MS unit is activated by an Operator subscriber inserting into the mobile telephone his/her SIM module, e.g. a SIM card (Subscriber Identity Module card), wherewith the VLR in the service area in which the MS unit is located obtains information to the effect that the SIM card has been inserted, via IMSI-attach (International Mobile Subscriber Identity). Similarly, the VLR obtains information when a SIM card has been removed from the mobile telephone, via IMSI-detach. Visitor location registers for IMSI-attach and IMSI-detach need not necessarily be one and the same. GSM includes a trace function. For instance, GSM-traces can be used to cause VLR to send IMSI-attach or IMSI-detach to the position handler. The service subscriber can obtain an indication of a change of driver in this way. Because the service subscriber is able to follow the vehicle through the cells of the mobile telephone system, he/she is also able to see indirectly when the vehicle remains stationary for a long period of time.

If it is found that the MS unit, and therewith the vehicle, has not updated its position after a number of simulated calls have been made, this may be due to the fact that the driver or chauffeur is resting, and it may therefore be considered unnecessary to maintain a connection with graphic presentation. The service subscriber can therewith make an economic savings by releasing the presentation connection temporarily. The connection between the operator and the service subscriber can be re-established subsequent to movement of the vehicle being registered by the position handler for instance. It may be necessary to allow, e.g., a specific number of updatings to be made before re-establishing the connection, so as to ensure that the vehicle is actually moving. Another reason why a number of updatings are preferably made is perhaps because a service subscriber desires updatings after a given distance, e.g. 5 km, has been travelled, wherein the position handler may have time to make a plurality of simulated cal connections. Alternatively, the service subscriber may desire the graphical presentation to show that the vehicle stands still. The indication to this effect may, e.g., be a colour indication on the graphic image of the vehicle, or a flashing function, etc.

If an MS unit is engaged when a simulated call setup is made, this is registered by the GSM system, which informs the position handler 14 to this effect. The positioning service subscriber can herewith be informed that the MS unit is engaged by a change in colour of the vehicle icon on the graphic presentation, or by flashing of the icon, etc.

MS units are classed in classes 1–5 according to their transmission power. A hand-held MS unit is classed in Class 4 or Class 5, whereas MS units having higher power outputs, such as vehicle-mounted units, are classed in Classes 1–3. If the driver of a vehicle has a hand-held MS unit classed as Class 4 or Class 5, the driver can place the unit in a hands-free booster-equipped adapter, wherewith the GSM system detects the higher transmission power of the MS unit and therewith triggers the position handler 14 to initiate a simulated call setup. When the driver removes the MS unit from the adapter, the position handler 14 is caused to release the simulated call setup in a similar manner. The newly described function can be made optional to the subscriber of the positioning service. Optional in this regard means that the service subscriber may also include the connection of a simulated call with a hand-held MS unit. In an alternative embodiment of the invention, see FIG. 3, a customer connected to the mobile positioning service, an MS unit, is ordered to position itself through the medium of a modified SMS message (Short Message Services). The SMS is modified such that the message will includes a unique character sequence, e.g. ($$©©). The SMS includes additional data associated with the order or command. A receiving mobile station interprets the unique character sequence as an SMS which shall not be indicated to the subscriber owning the MS unit, and the MS unit does not register the unique short message service (SMS) in its SMS catalog. This latter will also be understood as a simulated call setup; simulated insomuch as it is initiated by a modified SMS. The unique text message is now used solely by the MS unit for the ordered positioning assignment, wherein the MS unit creates setups to neighbouring base stations 44.

The aforesaid SMS processing is preferably effected through the medium of suitable software in the MS unit, such software not being the subject of patent and thus is not illustrated here.

Positioning is effected by sending the SMS to the position handler 14 for position handling purposes, said handler 14 including functions which are able to interpret and generate the short message services SMS. The position handler 14 forwards the SMS message to the intended MS unit.

The MS unit then carries out a sequence of procedures which results in the MS unit registering the parameters timing advance (TA) to the base station (BS 44) to which the MS unit is connected at that moment in time, and the cell identity (CellID). TA is included in a known process used to enable the radio signal of an MS unit located at a specific distance from the BS unit 44 onto which it is locked to be located within an allocated time slot in a TDMA system.

The sequence is based on the MS unit being programmed to send a paging request to the BS to which the unit is locked or connected. After the MS unit has obtained a response where necessary data has been registered (TA, CellID), the same sequence is carried out possibly for further BS units that are registered in the MS unit, i.e. the MS unit carries out a so-called multi-station measuring process. The data is sent from the GSM network to the MS unit via signals on layer 3. The reason why the MS unit only possibly and not necessarily carries out the same sequence is explained by the fact that it may be quite sufficient to know in which cell an MS unit is located when concerning inner city cells having transmission radii of 100–200 m.

Upon completion of the multi-station measuring process, the MS unit sends the result of said process to that position handler 14 which received the positioning order. The measuring result obtained is compared with the network data registered for the positioning area in question. The obtained data is filtered with unique network data through the medium of an algorithm in the position handler 14, wherewith the algorithm allocates a longitude/latitude position to the MS unit on the basis of the parameters obtained therefrom. The data concerning the established position is then sent to the customer who is able to process and show the position of the MS unit in accordance with the aforedescribed.

The broken line arrows in FIG. 3 indicate measurements on BS units ordered via SMS. The short arrow indicates the BS unit onto which the MS unit is locked at that moment.

Thus, the alternative embodiment which includes a modified short message service (SMS) involves the service subscriber sending a query to the position handling 14 regarding an indication of the position of a given MS unit connected to the service. A modified SMS according to the above is initiated by the position handler 14 to the MS unit concerned, the SMS initiating in turn a process (algorithm) in the MS unit. The process causes the MS unit to effect call setups in accordance with a programmed sequence, through one or more of the BS units which the MS unit has registered in its "neighbour" list of neighbouring base stations.

The call setups result in the MS unit registering TA and CellID. The parameters TA and CellID are obtained from the signals Immediate Assignment and System Information Type 6 respectively, which are specified in GSM. The signals are transmitted to the MS unit on layer 3 level (Layer 3 Level according to the OSI model). The MS unit ends the positioning queries according to the neighbouring list by sending a response in return to the position handler 14 with a modified SMS. The SMS contains all measuring results obtained with measured BS units.

The embodiment including short message services (SMS) also includes the possibility of ordering an MS unit to trigger its position. The position handler has then been ordered to send a modified SMS message which contains one or more CellIDs. When the MS unit finds this CellID in the signal system, information type 3 in GSM, which is received by the MS unit in idle mode, during the measuring process, the MS unit is triggered to position itself in accordance with the aforegoing and to send the response in return to the position handler 14, via a modified SMS. This enables the positioning of an MS unit to be programmed beforehand in a known manner and automatically released.

It is also possible to program in program loops in the position handler 14 for a positioning service subscriber, so that the position handler will generate modified SMS messages in accordance with the program loop. This also applies to the above embodiments which generate and release call setups upon receipt of a response which contains positioning parameters.

In tests carried in the City of Stockholm, an MS unit was localized with an area of ±200 m. In one instance, the MS unit was located in Strandvagen in the vicinity of Nybroplan and the position handler 14 quite rightly localized the MS unit as being in Strandvagen, about 200 m southwest of the exact place in Strandvagen.

The alternative embodiment of the present invention utilizes centre-of-gravity calculations based on the parameter TA in multi-station measuring processes, described in more detail with reference to FIG. 4.

Figure 4:
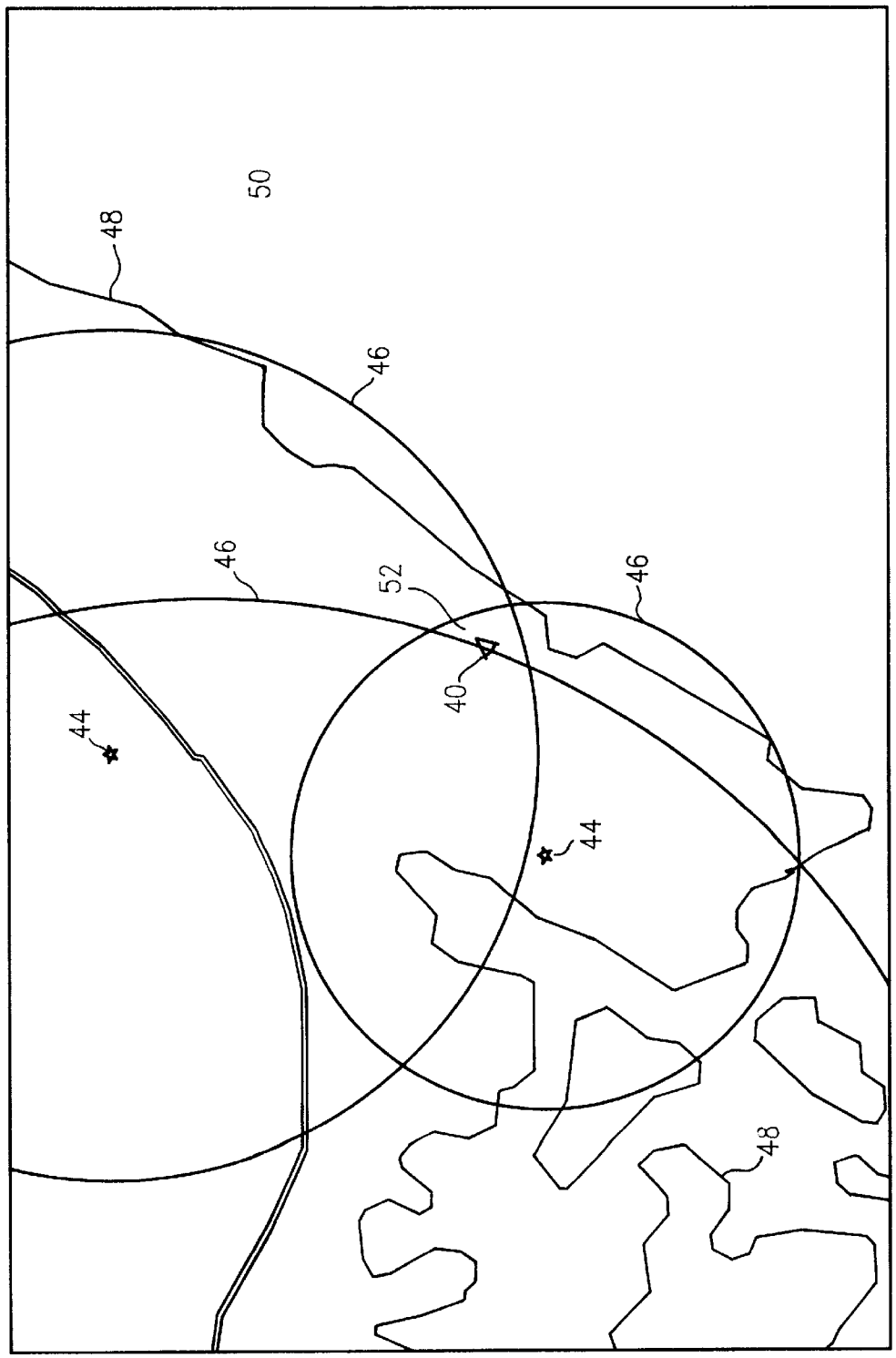
FIG. 4 is a chart illustrating the manner of determining the position of a vehicle with timing advance.

FIG. 4 is a schematic or simplified chart showing land contours 48 and sea 50. The chart includes three circles, either complete or partial, showing TA limits 46 in relation to BS units 44 (sites). The BS units 44 are placed in the centre of a cell 42. In FIG. 4, the area covered by one cell is so large that its BS unit 44 is located outside the chart.

The exact position of the vehicle 40 or MS unit on the chart is marked with a triangle.

The inner circles 46, best seen from FIG. 3, constitute TA limits, with 0–63 TA limits according to the Europolitan system Operator among others, there being obtained a distance of about 550 m between TA limits. Thus, the distance of an MS unit to a BS unit can be determined with a resolution of about 550 m in a cell. Three TA limits 46 intersect one another in FIG. 4. If the parameter TA for each limit in FIG. 4 is used to calculate a common centre of gravity in accordance with known mathematical formulae for such calculations, the centre of gravity will lie in the section of the TA limits marked by the surface 52. The surface 52 thus constitutes the uncertainty or the resolution in the calculation. In order to reduce uncertainty and improve resolution, the MS unit sequence with Paging Request is repeated for more than three BS units registered in the MS unit, therewith obtaining a smaller section.

The position of an MS unit is estimated with a centre-of-gravity calculation method. The calculation is based on the measuring data sent by the MS unit to the position handler 14. The position handler 14 includes memory resident information relating to the positioning of BS units and their respective coverage areas. This data is used as a basis for calculating the positions of MS units. In this regard, the centre of gravity constitutes the surface that is delimited by the measuring data obtained from MS units and intended for positioning said units.

Furthermore, when a positioning service subscriber has a vehicle which is located in other international Operators of compatible cellular mobile telephone systems, information is obtained with regard to the service area (VLR area) in which the vehicle carrying the mobile station is located, i.e. which Operator and in which country. The time of registration of the mobile telephone network of a foreign Operator is distributed by the GSM network to the HLR register of Operators in which MS units belonging to the service subscriber are registered. When the present invention can also be used by foreign Operators, all other already described functions and/or services can be used over national borders, for instance via an X.25 (interface functions when connecting data equipment to packet coupled networks) connection.

It will be understood that the aforedescribed and illustrated embodiments are merely preferred examples of the invention and that modifications and changes can be made within the scope of the following Claims.

I claim:

1. A method for determining a position of a mobile station in a cellular mobile telephone system, comprising the steps of:

initiating a simulated call setup between a position handler and the mobile station; and responding to the initiation of the simulated call setup, the response to the simulated call setup containing parameters for use in establishing the position of the mobile station, wherein the step of initiating the simulated call setup includes the step of generating a modified short message signal (SMS) which is not registered in the SMS catalogue of the mobile station and which is not shown to the user of the mobile station, said SMS commanding the mobile station to carry out a position determining sequence in order to establish said parameters.

2. A method according to claim 1, further comprising the step of releasing said simulated call setup after receiving said response from said mobile station.

3. A method according to claim 1, wherein said step of initiating the simulated call setup includes the step of commanding the mobile station to carry out said position determining sequence by establishing simulated call setups between said mobile station and said base stations according to a list of neighboring mobile stations.

4. A method according to claim 1, wherein said parameters include at least one of a cell identity (Cell ID) and timing advance (TA).

5. A method according to claim 1, wherein said step of carrying out the positioning determining sequence includes the step of determining a position of said mobile station with respect to multiple base stations.

6. A method according to claim 5, further comprising the step of determining a longitude and latitude of said mobile station based on a longitude and latitude of an intersection of the cells of said multiple base stations.

7. A method according to claim 5, further comprising the step of determining the position of said mobile station by center-of-gravity calculations with respect to respective said parameters obtained from said multiple stations.

8. A method according to claim 1, wherein said modified SMS message generated by the position handler includes at least one Cell ID which triggers the mobile station to carry out said position determining sequence.

9. A method according to claim 1, wherein said position handler further carries out the steps of categorizing mobile stations intended for simulated call setups using a home location register (HLR) in a global system for mobile communications (GSM), and analyzing said simulated call setups using means that are present in a mobile services switching station.

10. A method according to claim 1, wherein said position handler further carries out the step of categorizing mobile stations intended for simulated call setups using an administrative device having a register, and the steps of generating and releasing said simulated call setups using at least one call generating device and said administrative device.

11. A method according to claim 1, wherein said parameters include cell identities, and further comprising the step of, subsequent to said simulated call setup, processing said cell identities by converting said cell identities to provide a longitude and latitude of said mobile station with regard to base stations related to said cell identities.

12. A method according to claim 1, further comprising the steps of electronically transmitting a graphic presentation of said position of said mobile station to a subscriber with the aid of a customer positioning connection; and updating said position of said mobile station on said graphic presentation subsequent to simulated call setups.

13. A method according to claim 12, wherein said subscriber carries out the step of determining a frequency of said simulated call setups.

14. A method according to claim 12, said graphic presentation includes information relating to vehicles assigned to said mobile stations.

15. A method according to claim 14, further comprising the step of activating said information relating to said vehicles by activating a graphic representation of one of said vehicles on said display.

16. A method according to claim 12, further comprising the steps of interrupting said customer positioning connection subsequent to having established a specific number of simulated call setups without said mobile station having changed position; and restoring said customer positioning connection when at least one change in said position of said mobile station is detected.

17. A method according to claim 1, further comprising the step of detecting a change of driver of a vehicle assigned to the mobile station based on an identity with which the driver activates or deactivates the mobile station.

18. A method according to claim 17, wherein said driver activates or deactivates said accompanying mobile station through a SIM module.

19. A method according to claim 1, wherein the step of initiating said call setup includes the step of placing a hand-carried station into a power amplifying adapter and initiating the call setup in response to a resulting change in transmission power.

20. A method according to claim 1, wherein operation of said position handler is controlled by a program loop stored in the position handler for a subscriber.

21. A system for determining the position of a mobile station in a cellular mobile telephone system, comprising:
a position handler including means for initiating a simulated call setup with a mobile station; and
means for responding to the initiation of the simulated call setup, the response containing parameters for use in establishing the position of the mobile station,
wherein the means for initiating the simulated call setup includes means for generating a modified short message signal (SMS) which is not registered in the SMS catalogue of the mobile station and which is not shown to the user of the mobile station, said SMS commanding the mobile station to carry out a position determining sequence in order to establish said parameters.

22. A system according to claim 21, further comprising means for releasing said simulated call setup after receiving said response from said mobile station.

23. A system according to claim 21, wherein said means for initiating the simulated call setup includes means for commanding the mobile station to carry out said position determining sequence includes means for establishing simulated call setups between said mobile station and base stations according to a list of neighboring mobile stations.

24. A system according to claim 21, wherein said parameters include at least one of a cell identity (Cell ID) and timing advance (TA).

25. A system according to claim 21, wherein said step of carrying out the positioning determining sequence includes means for determining a position of said mobile station with respect to multiple base stations.

26. A system according to claim 25, further comprising means for determining a longitude and latitude of said mobile station based on a longitude and latitude of an intersection of the cells of said multiple base stations.

27. A system according to claim 25, further comprising means for determining the position of said mobile station by center-of-gravity calculations with respect to respective said parameters obtained from said multiple stations.

28. A system according to claim 21, wherein said modified SMS message generated by the position handler includes at least one Cell ID which triggers the mobile station to carry out said position determining sequence.

29. A system according to claim 21, wherein said position handler includes means for categorizing mobile stations intended for simulated call setups using a home location register (HLR) in a global system for mobile communications (GSM), and analyzing said simulated call setups using means that are present in a mobile services switching station.

30. A system according to claim 21, wherein said position handler includes means for categorizing mobile stations intended for simulated call setups using an administrative device having a register, and said means for generating said simulated call setups includes at least one call generating device and said administrative device.

31. A system according to claim 21, wherein said parameters include cell identities, and further comprising means for, subsequent to said simulated call setup, processing cell identities by converting said cell identities to provide a longitude and latitude of said mobile station with regard to base stations related to said cell identities.

32. A system according to claim 21, further comprising means for electronically transmitting a graphic presentation of said position of said mobile station to a subscriber with the aid of a customer positioning connection; and updating said position of said mobile station on said graphic presentation subsequent to simulated call setups.

33. A system according to claim 32, wherein said subscriber carries out means for determining a frequency of said simulated call setups.

34. A system according to claim 32, said graphic presentation includes information relating to vehicles assigned to said mobile stations.

35. A system according to claim 34, further comprising means for activating said information relating to said vehicles by activating a graphic representation of one of said vehicles on said display.

36. A system according to claim 32, further comprising means for interrupting said customer positioning connection subsequent to having established a specific number of simulated call setups without said mobile station having changed position; and restoring said customer positioning connection when at least one change in said position of said mobile station is detected.

37. A system according to claim 21, further comprising means for detecting a change of driver of a vehicle assigned to the mobile station based on an identity with which the driver activates or deactivates the mobile station.

38. A system according to claim 37, wherein said driver activates or deactivates said accompanying mobile station through a SIM module.

39. A system according to claim 21, wherein said means for initiating said call setup includes means for placing a hand-carried station into a power amplifying adapter and initiating the call setup in response to a resulting change in transmission power.

40. A system according to claim 21, wherein operation of said position handler is controlled by a program loop stored in the position handler for a subscriber.

* * * * *